July 29, 1958  F. M. DEMER  2,845,224
CARD COMPARING MEANS
Filed May 23, 1955  8 Sheets-Sheet 1

INVENTOR
FREDERICK MURRAY DEMER
BY
ATTORNEY

FIG. 8

July 29, 1958 F. M. DEMER 2,845,224
CARD COMPARING MEANS
Filed May 23, 1955 8 Sheets-Sheet 3

FIG. 9

INVENTOR
FREDERICK MURRAY DEMER
BY
ATTORNEY

July 29, 1958     F. M. DEMER     2,845,224
CARD COMPARING MEANS Filed May 23, 1955     8 Sheets-Sheet 4

INVENTOR
FREDERICK MURRAY DEMER
BY
ATTORNEY

July 29, 1958     F. M. DEMER     2,845,224
CARD COMPARING MEANS
Filed May 23, 1955     8 Sheets-Sheet 6

FIG. 14

INVENTOR
FREDERICK MURRAY DEMER
BY
ATTORNEY

July 29, 1958  F. M. DEMER  2,845,224
CARD COMPARING MEANS
Filed May 23, 1955  8 Sheets-Sheet 7

INVENTOR
FREDERICK MURRAY DEMER
BY
ATTORNEY

July 29, 1958    F. M. DEMER    2,845,224
CARD COMPARING MEANS
Filed May 23, 1955    8 Sheets-Sheet 8

INVENTOR
FREDERICK MURRAY DEMER
BY
ATTORNEY

United States Patent Office 2,845,224
Patented July 29, 1958

2,845,224

CARD COMPARING MEANS

Frederick Murray Demer, Johnson City, N. Y., assignor to International Business Machines Corporation, New York, N. Y., a corporation of New York Application May 23, 1955, Serial No. 510,403

10 Claims. (Cl. 235—61.7)

This invention relates to business machine controls and particularly to a matrix of magnetic cores fabricated into an electronic network for sensing the records punched in a succession of business machine cards and for comparing the record of each card with that of the immediately preceding card.

The object of the invention is to provide a high speed device which will sense the cards and provide an indication that the card presently being sensed has a record higher than, equal to, or lower than the record of the card immediately and previously sensed at the maximum speed at which the cards can be handled mechanically.

The invention resides in the use of a matrix of bistable magnetic memory elements which make it possible to employ but a single card sensing station to compare the records on two separate cards. The record on one card remains in its entirety in the matrix of memory elements until the connections for the transfer of the record on the next card are established. Thereupon the elements are each rapidly given first a negative energization and then a positive energization and the succeeding manifestations of the change in state are merged and combined into a high, equal, or low signal conventionally useful.

If when a core is subjected to the first or negative energization it is found in the condition expressing binary 0, then no manifestation will result, but if it is found in the condition expressing binary 1, then on its resulting change of state on a return to the condition expressing binary 0 a signal will be created and transmitted to a signal responsive circuit to produce an embracing signal. Thereafter this core is subjected to the second or positive energization providing the sensing means reports a record as existing at a corresponding location in the card presently at the sensing station. If such a record is present, the core will be driven from its binary 0 state to its binary 1 state and as a result thereof another signal will be created and transmitted to a signal responsive circuit to produce another signal within the embrace of said first signal. Thus two signals created separately in time are merged into a single response.

By means of a matrix into which these time merged signals are fed, they may be combined into either a high, an equal, or a low control signal. By way of example, if the first card reported a value 3 whereas the second card reported a value 4, then the merging signals would combine through the said matrix to produce a high control signal. If both cards report a value of 3, then an equal control signal will be produced and if the first card reports a value 3 whereas the second card reports a value 2 then a low control signal will be produced.

Since each column of the card is scanned separately and successively a value such as 1, 2 3 4, 5 6 7 on the first card compared to a value such as 1, 2 3 4, 5 6 8 in the second card each contained in seven column will produce a high signal consisting of six succeeding equal signals and one high signal.

Should the first card contain a record 1, 2 3 4, 5 6 7 and the second card contain a record 1, 2 3 5, 4 5 6, the report would be equal, equal, equal, high, low, low, low but conventional means would be used to convert this into an overall high response, this mean not forming part of the present invention. Thus the change in the highest significant digit of a value constitutes the signal which will be used as a control.

A feature of the invention is a matrix of bistable magnetic memory elements combined with means for successively reading into such a matrix, column by column, the record on a business machine card and for simultaneously transmitting a signal for each core element affected in this read in operation for use in comparison with similar signals previously produced on a read out operation. Through this feature the record normally punched in a business machine card may be simultaneously recorded in a matrix and used for a comparison operation.

Another feature of the invention is a means for restoring the elements of a matrix of bistable magnetic memory elements from a state in which one or more thereof may express a BIT to a normal state, combined with means for successively reading out of such matrix, column by column, the record of a business machine card previously transferred to such matrix and for simultaneously transmitting a signal for each said element so restored to normal for use in comparison with similar signals which will thereafter be produced on a read in operation.

Another feature of the invention is a means for reading out the record of a business machine card sensed at an indefinite time theretofore and thereafter reading in the record of another card and comparing the read out and read in signals by combining such signals in time to produce single comparison signals. In accordance with this feature the read out signals and the read in signals are separately produced in time, but the read out signal is prolonged in time to embrace the later read in signal.

Another feature of the invention is a means for combining in time a pair of time spaced signals which consists of recording and prolonging the first of said signals over the time of the second one thereof and applying such signals to an And circuit for deriving a single signal as the combination of the two.

Still another feature of the invention is a matrix of coordinately arranged circuits having an And circuit connected to the two intersecting circuits at each point of intersection, each said And circuit having an output circuit thus representing the concurrent activation of the particular two intersecting circuits.

Other features will appear hereinafter.

The drawings consist of eight sheets having nineteen figures, as follows.

In the following description certain terms are used and many basic circuit components are mentioned. By way of explanation the following prior art disclosures are set forth and reference is made thereto for a complete description of any given circuit and the manner of its operation.

Patent 2,628,309, February 10, 1953, issued to E. S. Hughes, Jr. for an electronic storage device.

Patent 2,573,313, October 30, 1951, issued to Dayger et al., for a record controlled bill printing device.

A BIT is a binary item, that is, a signal indicating a 1 in the binary code of 0 and 1, these numerals being used merely as an expression of two opposite states. Since it is convenient to speak of such opposites, such as a hole in a punched card as a binary 1 and the absence of a hole as a binary 0, and since this terminology is also conventionally used to express the two opposite states of a magnetic element, it will be understood hereinafter that the term BIT or the term binary 1 is being used to express the presence of a hole in a punched card.

A BIT or a hole in a punched card may signify any information desired in accordance with its location on the card, such for instance as the digits 1 to 9 inclusive.

A bistable magnetic memory element is a device which may be driven to one or another of two stable states, in one of which it is said to express binary 1 and in the other of which it is said to express binary 0. It should be clearly understood that the actual state in which these BITS are expressed is immaterial, it being only important that if the element is driven by a single coil, that current in one direction will drive the element to binary 1 while current in the other direction will drive the element to binary 0.

Up and Down refer to potentials. In the circuitry of the present invention, each component, such for instance as a tube circuit, is arranged to be active when the potential on its control conductor is Up and inactive when such potential is Down. Generally, as in a cathode follower circuit, when the potential on an input terminal is Up the potential on the output terminal is Up, and likewise, when the potential on an input terminal is Down the potential on the output terminal is Down. It may be stated, merely by way of example, that a potential of plus 5 volts or more will constitute an Up condition and a potential of minus 30 volts or less will constitute a Down condition. Up means that the voltage present at a particular point is positive with respect to ground, and Down means that the voltage present is negative with respect to ground. If the control grid of a vacuum tube is referred to as Down, it means that the voltage at that control grid is below the cutoff value of the vacuum tube.

Numerous coincidence circuits are employed herein. An And circuit refers to a circuit which is operable to produce an Up condition on its output terminal only when all of its input terminals are Up. An Or circuit refers to a circuit operable to produce an Up condition on its output terminal when any one or another or more of its input terminals are Up.

A cathode follower circuit (CF) is a tube circuit having its anode firmly tied to a positive potential source or otherwise arranged so that the grid constitutes an input and the cathode or cathode circuit constitutes an output. When the grid is Up, the cathode will go Up and when the grid is Down the cathode will go Down.

The And and Or circuits may be combined with the cathode follower circuits, in which case they are designated And—CF and Or—CF respectively.

The invention utilizes numerous dual-type tubes having two sections in a single envelope. Each such section is referred to herein as a tube and designated by a number follower by the letter L or R or simply by the letters L and R to indicate the left-hand or right-hand tube section respectively. A tube so referred to is similarly designated thereafter if employed with the same immediate circuitry and for the same purpose even though it is not shown with its corresponding L or R tube.

Another component of these circuits is an inverter. This generally includes a tube and is so arranged that when the input is Down the output is Up and when the input is Up the output is Down.

An important component of these circuits is a latch, made up essentially of an And circuit for an input, two inverters in cascade and a cathode follower circuit.

When one of the inputs of such a circuit is driven Up and the cathode follower is simultaneously driven Up, the output of the cathode follower will act to drive the other input terminal Up. Thereupon the output of the first inverter will go Down, the output of the second inverter will go Up and the input and the output of the CF will remain Up. Thereafter the CF will remain Up so long as the first input of the And circuit is held Up and an Up signal will appear on the output of the CF during this period. Such a latch is fully disclosed in the said Hughes patent.

Figures 1, 2, 3, 4, 5:
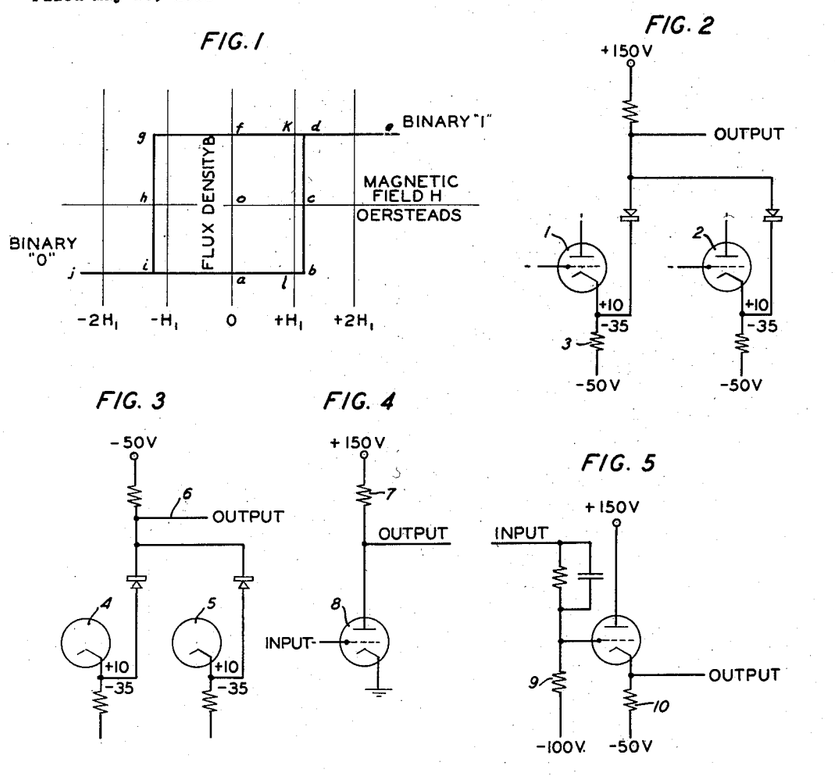
Fig. 1 is an idealized hysteresis loop of the magnetic core material used.
Fig. 2 is a circuit diagram of a typical And circuit.
Fig. 3 is a circuit diagram of a typical Or circuit.
Fig. 4 is a circuit diagram of a typical INV circuit.
Fig. 5 is a circuit diagram of a typical CF circuit.

The basic element employed for the purposes of the present invention is a bistable magnetic core interlinked with a plurality of windings. Such magnetic material is characterized by high retentivity whereby the field strength attained upon saturation in either the positive or the negative direction is largely retained after the magnetomotive force applied is relaxed. Fig. 1 is an idealized hysteresis loop for such a commercially obtainable material. If the core is in the state of remanence indicated by the point *a,* then an application of any degree of negative magnetomotive force or of up to something slightly over +H₁ will not change this state and upon relaxation of the magnetomotive force the material of the core will return to the point *a.* However, if a good deal more than +H₁ is applied so that the point *b* is passed, then the curve *abcde* will be traced and upon relaxation the state of remanence will retreat to the point *f,* which can only be altered thereafter by the application of a negative magnetomotive force sufficient to pass the knee of the curve *g.* Thus the element may be driven to one or another stable state at will. A change of state may be detected by observing a pulse induced in a winding about such a core by the collapse of the field in one direction and its build up in the other direction.

Fig. 2 shows a typical And circuit. It consists essentially of two or more diodes connected between two or more input circuits and leading to a common output circuit so poled that the resistance of any one of the diodes is high when measured from the input to the output and conversely is low when measured from the output to the input. The output is connected through a resistor to a comparatively high positive potential. However, if both or either of the inputs is Down, that is, at a normal low potential, here indicated as −35, then the output will be at substantially −35 because of the low resistance path from the output through a diode to the input. The output is then said to be Down. Now if but a single input is left Down, even though the other or the remainder of the others, where a large plurality of inputs is used, are Up the output is maintained Down. However, when all of the inputs have been driven Up the output will go Up. This is known as an And circuit because with two inputs both one and the other of them must be Up to allow the output to go Up.

In Fig. 2, with neither input tube 1 nor input tube 2 active, the cathode potential of each will be governed by the cathode resistor, such as 3, and since little current is flowing in the tube this potential will be low (−35 by way of example) and hence the potential of the output will be at substantially that same value. The tubes 1 and 2 are not necessary parts of the And circuit but are shown as one typical manner of controlling the Up and Down potentials to be applied to the input terminals thereof. Only when both tubes 1 and 2 are active does the output potential rise to (+10 volts as indicated) a value which is considered to be Up.

It may be noted here that such an And circuit may be made to operate as an Or circuit. If the normal connections to such a circuit are Up conditions on all the inputs so that normally the output is held Up, then a negative pulse applied to either one or the other of the inputs will act to bring the output Down. Such a circuit operation will appear hereinafter where a large number of diodes are connected to an output which is normally Up and where a negative pulse applied to any one of the said large number of diodes will serve to bring this output Down.

Fig. 3 shows a conventional arrangement known as an Or circuit. Here the two input tubes 4 and 5 are normally not conducting and hence their outputs are normally Down or −35 volts as indicated by way of example. Now if either of these input tubes becomes conducting, its output rises to +10 volts and hence the output 6 rises despite the fact that the other tube output may still be Down.

Again it is to be noted that this circuit may be operated as an And circuit. If all the inputs are normally held Up, the output 6 will be held Up until all are Down. Thus it takes the simultaneous application of a negative signal to all of the diodes to bring the output 6 Down.

Fig. 4 shows an inverter. When the input thereof is Down the output will be Up since there is no voltage drop developed by the resistor 7. However, when the tube 8 becomes active the output is moved to a potential somewhere between ground and the negative voltage to which a resistor 9 (the output of an inverter may be connected to the input of another circuit such as Fig. 5) is connected (−35 volts by way of example) and this constitutes a Down condition.

Fig. 5 shows the essential elements of a cathode follower circuit. Under normal conditions the output is substantially at the potential to which the cathode resistor 10 is connected and since this is a minus value (−35 volts by way of example), it constitutes a Down condition. When the input is driven Up the tube becomes active and the cathode approaches the potential of the anode and this constitutes an Up condition. The cathode potential follows that applied to the grid within normal operating range of grid potential.

An INV—CF may be formed by connecting the output of the inverter shown in Fig. 4 to the input of the cathode follower shown in Fig. 5.

Figure 6:
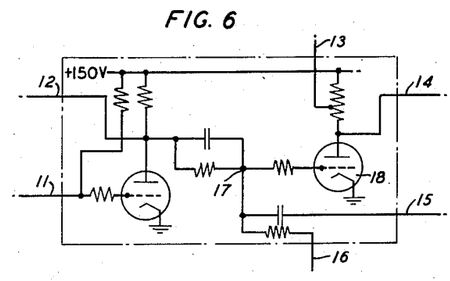
Fig. 6 is a circuit diagram of a double inverter circuit enclosed in a broken line rectangle where the location of the various input and output leads may be noted particularly where this double inverter is represented as a rectangle as in Fig. 7.

Fig. 6 shows the internal circuitry of the components of a latch unit boxed in a broken line rectangle from which the locations of the input and output leads shown in the block representations of such unit shown in Fig. 7 and used hereinafter will be plain. When the latch is inactive the input 11 is Down so that the output point 17 is Up. This point being connected to the input of inverter tube 18, the output 14 of this tube will be Down. When a number of these latch units are connected in a counting chain or ring then the output terminal 13 of one will be connected to the input terminal 15 of the next in order latch whereby as an active latch is rendered inactive the change from Up to Down on terminal 13 will constitute a negative pulse on the input terminal 15 of the next in order latch to transiently depress the input of its tube 18 to force its output terminal 14 Up, thereby rendering the connected CF active to connect an Up potential on one of its And circuit input terminals so that coincidence will be established with an Up potential simultaneously being applied to the other of its And circuit input terminals.

Figure 7:
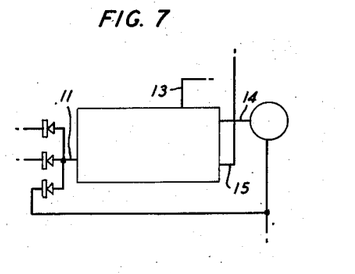
Fig. 7 is a representation of a latch consisting of a double inverter, a CF circuit and an And circuit.

It is believed that this operation will be plain from the block representation of the latch in Fig. 7 where the rectangle represents the circuit shown in Fig. 6, the circle to the right represents a CF circuit and the diodes to the left connected to the input conductor 11 represent an And circuit.

Before going into the details of the complete circuitry of the present invention a number of trains of pulses should be noted. These are pulses derived from any conventional source and are used herein for control purposes.

Figure 8:
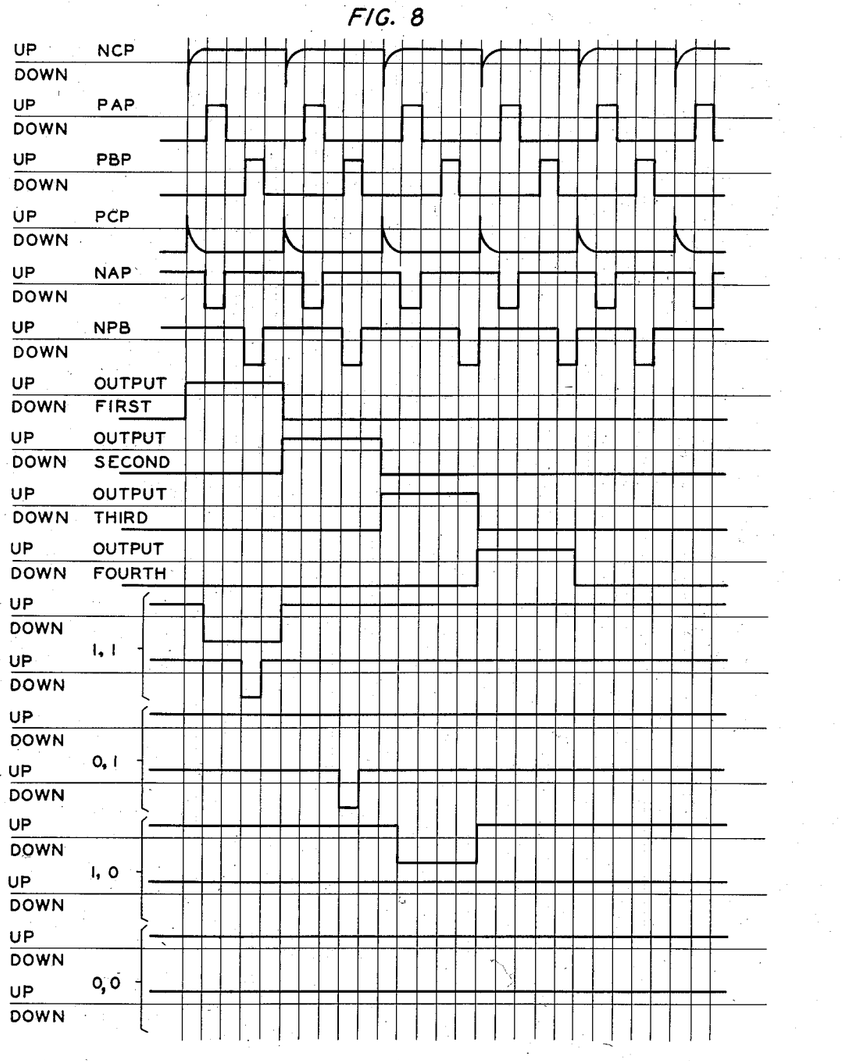
Fig. 8 is a nest of graphs drawn on a single time scale showing the three pairs of positive and negative A, B and C pulses used to control the circuits of the present invention, four representative latch circuit outputs and four pairs of combinations of the two output impulse possibilities responsive to the releasing and recording pulses transmitted in each time cycle to test the record left by a previously sensed card and a presently sensed card at the time in the single sensing station.

Fig. 8 shows a set of graphs, each of a train of pulses which will be supplied over appropriate connections to various parts of the circuit. Each has a zero potential and below which the connection will supply a Down potential. The first of these graphs is marked NCP for negative C pulse. It will be noted that any circuit point to which such a potential is supplied will be normally Up and that periodically a negative pulse occurs. Let us assume, by way of example, that the periodicity of these negative pulses is 100 kilocycles, then it will be plain that such a negative pulse occurs every ten microseconds.

The next graph is that for the positive A pulses, marked PAP. Here a circuit to which these pulses are supplied will be normally Down but will be driven Up periodically.

The positive B pulses, PBP are the same as the positive A pulses but are displaced in time therefrom. It should be especially noted that a period marked by any two succeeding C pulses will embrace an A pulse and a B pulse, these two occurring in succession.

It is believed that the next three graphs showing the positive C pulses, the negative A pulses, and the negative B pulses will be completely understandable without further explanation.

When a plurality of these latches are arranged in a ring as fully explained in the above noted Hughes patent, each stage will be successively activated so that the outputs thereof will each be driven Up in turn as indicated by the seventh, eighth, ninth, and tenth graphs of Fig. 8.

Fig. 8 also contains four groups of two graphs each showing the four combinations of operations which may take place under different circumstances all of which will be described in full hereinafter. It will appear that there is a circuit leading to a normally Up latch which will be responsive to a negative A pulse (NAP) in coincidence with a change in state of magnetic memory element from binary 1 to binary 0. This will result in the release of the latch and the latch thus released will remain released after the A pulse has terminated so that a Down condition which it has produced will overlap in time any effect of a following B pulse and thus combine the effect of these two (A and B) pulses into a single signal.

The eleventh and twelfth graphs show (within the stage 1 interval) the effects produced when a record from a previous card is erased and when a record from the card presently being sensed is recorded.

The thirteenth and fourteenth graphs show (within the stage 2 interval) the effects produced when no record from a previous card is found but where a record from the card presently being sensed is recorded.

The fifteenth and sixteenth graphs show (within the stage 3 interval) the effects produced when a record from a previous card is erased and where there is no record from the card presently being sensed to be recorded.

The seventeenth and eighteenth graph show neither a previous record nor a present record.

The means for translating these combined signals into four different indications for business machine control will be expalined in more detail hereinafter.

The present invention is an adaptation of a circuit arrangement including these basic circuits used in combination with a matrix of bistable magnetic memory elements equal in number to the number of places on a conventional business machine card, 80×12=960 in one example. Here a card is run through a business machine and at a given stage the holes punched therein are sensed and the complete record thereon is transferred to the said matrix of bistable elements. When the next card reaches this station all the previously energized memory elements are returned to normal and a completely new record is made. Looking at Fig. 8 it may be stated at this time that when a second card reaches the sensing station the previously made record in the memory element matrix is erased by an A pulse and a new record is made by a B pulse. Where the business machine card has eighty columns of twelve rows each, the operations above stated may be carried out in eighty steps, one step for each column of punched holes. Since a signal may be derived from a bistable magnetic memory element on a change in state in either direction, it will be apparent that the erasure of a record in any column will produce a signal in each row that contained a record from a previous operation and that another signal will be produced when a new record in this row is being established. Thus a complete pattern of signals giving a record from a previously sensed card and the signals giving a record of a presently sensed card may be derived for use in any conventional way.

Figure 9:
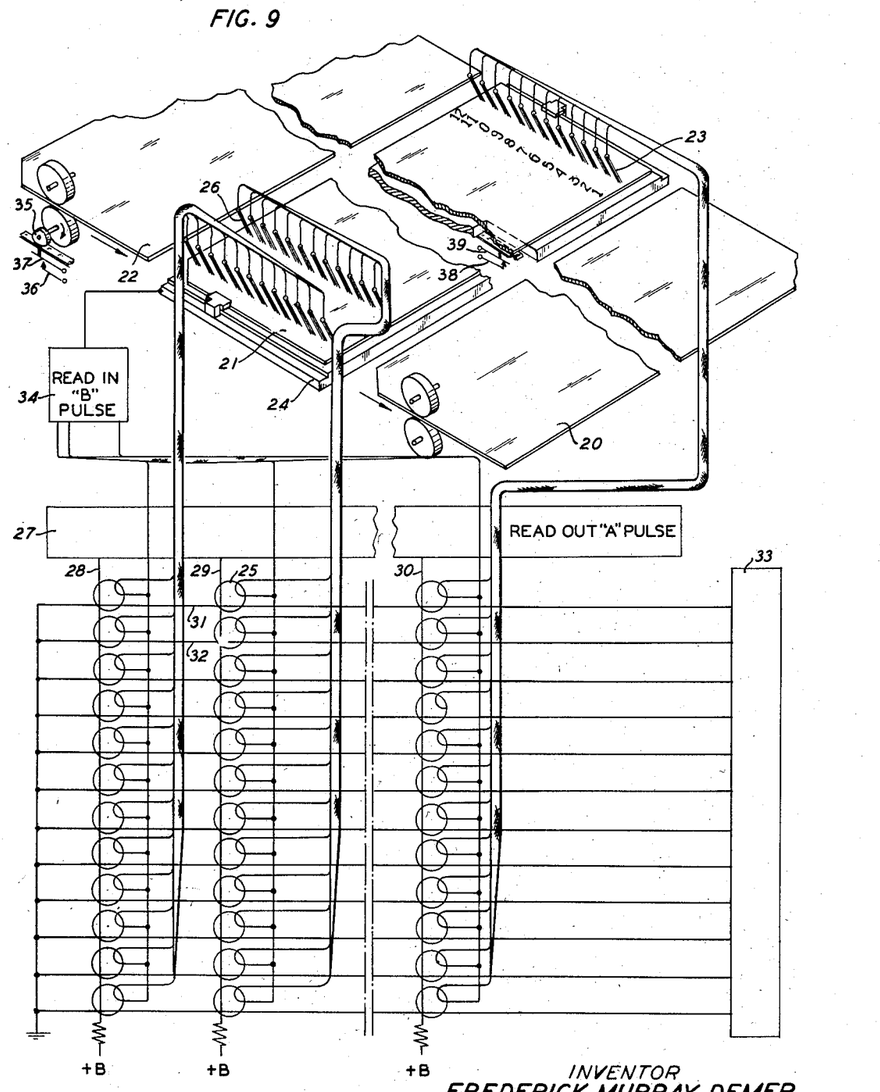
Fig. 9 is a schematic drawing partly in circuit diagram and partly in perspective, showing the arrangement of a plurality of bistable magnetic memory elements in a matrix and a single stage card sensing station with a previously sensed business machine card, a presently sensed card under the sensing brushes and one of a plurality of other cards about to be sensed.

Fig. 9 is a schematic showing, partly in perspective, partly in section and partly in circuit diagram showing how the business machine cards may be processed and this constitutes but one embodiment of the invention. Three business machine cards are shown. Card number 20 is what might be termed a previous card, that is, one which has just been ejected from the sensing station.

Card 21 is what might be termed a present card, that is, one which is at present in the sensing station wherein a brush or some similar type of electrode 23 is pressing against the card and which will make electrical contact with a bed plate 24 if a punched hole is found at that particular place on the card. Card 22 is the next card which will be placed in the sensing station.

The movement of the cards through this sensing station is very rapid since the circuit arrangements are capable of serially testing the eighty columns all in a small fraction of a second. The means for moving the cards, getting them into exact alignment, and so forth for processing at high speed is not shown since this a mechanical problem and is not a part of the present invention. There is a showing of two pair of springs, conventional in such a machine. In one case a cam 35 closes a circuit through springs 36 and 37 and in the other case a contact is closed through springs 38 and 39 when the card is properly seated in position. In accordance with the mechanical arrangements conventionally employed a circuit will be closed through both pairs of these springs at a predetermined point in the cycle of operation of the machine. There is therefor provided a control means responsive to the proper seating of the card at the testing station.

Three rows, representative of eighty rows, of bistable magnetic memory elements are shown. Each bistable element is shown as a ring, such as the ring 25 and this is coupled with a circuit leading to a separate brush 26. A circuit arrangement represented by the rectangle 27 is provided for successively energizing the conductors 28, 29 and 30 (representing the eighty columns) each interlinked with the twelve bistable elements in each column and controlled by an A pulse to erase any record contained in the elements of the corresponding column. Horizontal conductors such as the conductors 31 and 32 are each interlinked with the eighty bistable elements in each of the twelve rows and lead to a circuit generally represented by the reactangle 33 where the pulses generated by a change in state of a corresponding bistable element from a binary 1 to a binary 0 may be detected and translated to a control signal. Means are also provided in the form of a circuit arrangement 34 to transmit a B pulse through the individual conductors of each of the bistable elements successively in each column to cause a change in state of those elements associated at the time with a brush which has found a punched hole. At this time also the horizontal wires are effective, so if one element, 25 by way of example, had been at binary 1 by the previous card and will now be driven back to binary 1 by the present card, then two pulses, one controlled by the A pulse and a second controlled by the B pulse will be transmitted over conductor 31 to the circuit 33 where they will be merged into a single control signal.

It may be noted at this point, that whereas Fig. 9 indicates a complete matrix of 12×80 magnetic elements and the manner in which a card may be memorized so that when the next card is placed in the reading station there will be available both the record of the previous card stored in the magnetic elements and the record of the present card physically embodied in the punchings therein, the dispositions of these two records may thereupon be handled in accordance with any plan which may or may not involve the complete record of both. Likewise the circuits of Figs. 11 and 12 will show a means whereby 80 terminals each corresponding to one of the 80 columns may be serially traversed or whereby a signal may be transmitted over each of these 80 terminals in succession. It is not necessary that all the columns be placed under such a test but only a few thereof in accordance with the operation being performed in the business machine.

It is usual in these business machine cards to employ ten of the twelve places in each column for the recording of numeric information and to employ the remaining two places in conjunction with the ten places employed for numeric information for alphabetic information. Thus certain columns having holes punched in the two remaining rows will constitute controls and other columns having holes punched in the ten rows employed for numeric information will constitute the essential record carried by the card.

As an illustration of one manner of employing the core matrix sensing means of the present invention the circuits about to be described will be confined to the ten rows of holes reserved for the numeric information, it being understood that other and essentially similar circuits may be employed to process the records of the alphabetic information. It may also be noted that it is not necessary to process the information in all 80 columns but in accordance with the function of any particular business machine only given ones of the 80 columns may be scanned and the information so processed. Thus only a portion of the complete matrix herein disclosed may be usefully employed.

The comparison of the relative value of the numeric record in corresponding columns of successively scanned cards may be confined to a single column or to several columns. It is seldom necessary to compare very large multi-digit numbers so it will be understood that whereas the capability of comparing 80 digits of one card with 80 digits of a succeeding card is herein disclosed, the commercial adaptation of this arrangement will vary in accordance with the functions of the particular machine.

Figure 11:
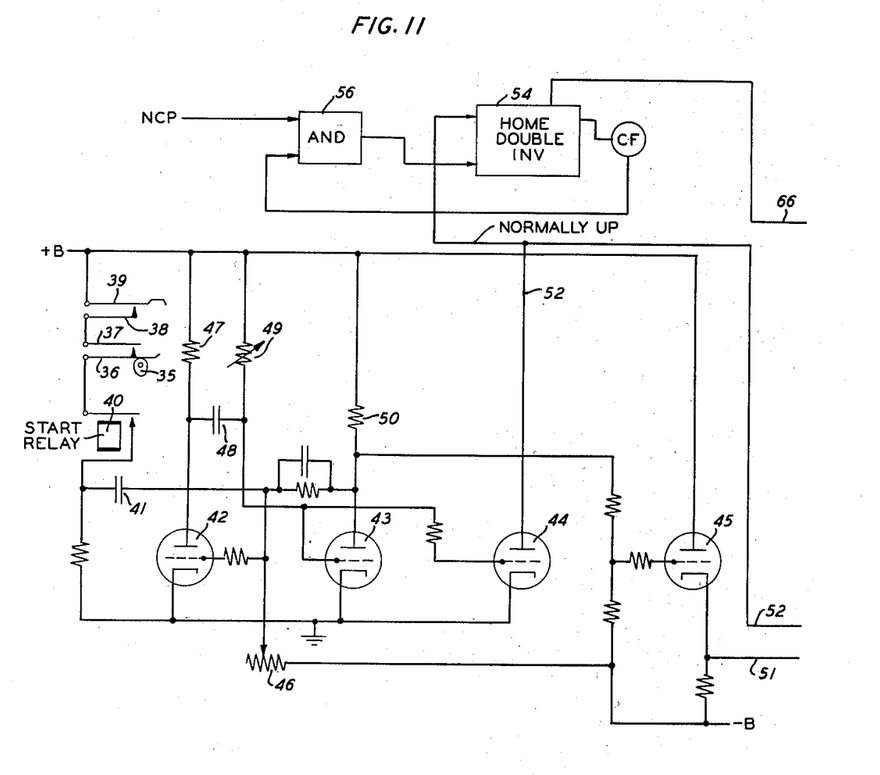
Fig. 11 shows a multivibrator circuit and a Home latch used for triggering the action of the counting latches of Fig. 12.
Figure 12:
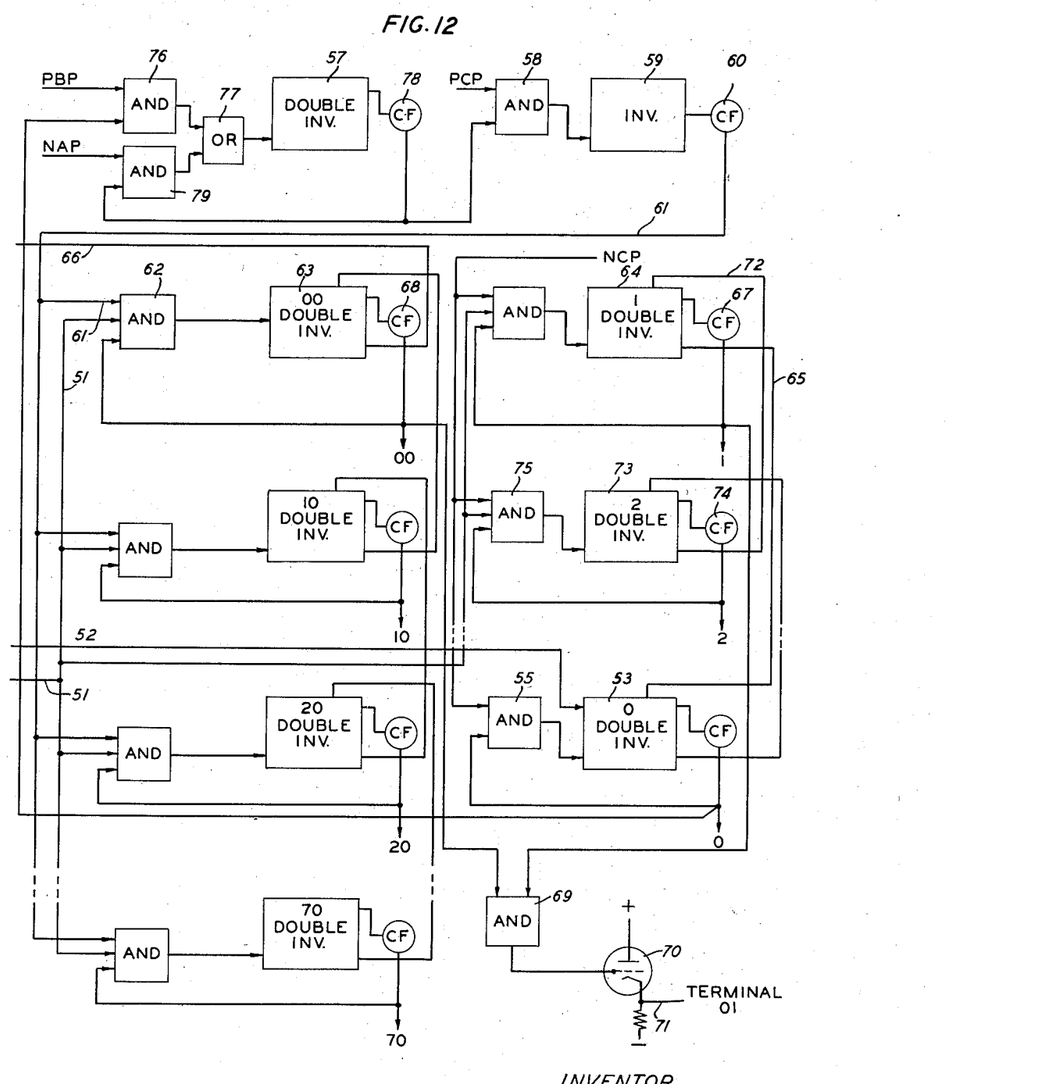
Fig. 12 is a block type circuit schematic showing the circuits of the means employed to successively scan the eighty columns of a typical business machine card.

The operation of the circuits of the present invention may be understood by first considering those circuits shown in Figs. 11 and 12. When the machine is started into operation and the various tubes are considered to be sufficiently warmed up, the machine is started in a conventional manner by the operation of a master switch which will cause the operation of a motor to control the mechanical movements thereof such as the rotation of the conventional cams including the cam 35. This will also cause the operation of the usual start relay indicated in Fig. 11 as relay 40. Thus periodically a circuit will be closed from a positive potential source through the card lever springs 38 and 39, the cam spring 36 and 37 and the contacts controlled by the relay 40 to the condenser 41. Since the electronic circuitry about to be described is capable of operating at a speed far beyond the mechanical capabilities of the machine, the successive operations of the card lever springs 38 and 39 will be controlled by different cards and generally speaking the periods of operation of these springs 38 and 39 will be of greater duration than the springs 36 and 37 so that the operation of this circuit is essentially controlled by the cam 35.

Fig. 11 involving the four tubes 42, 43, 44 and 45 is a triggering circuit which will establish certain given conditions upon the closure of the circuit through the springs 36 and 37 and maintain these conditions for an interval sufficiently long for the counting circuit of Fig. 12 to go through a complete cycle. The conditions establish by this triggering circuit are then relaxed and the circuits returned to normal (unoperated) until the following closure of the circuit through the springs 36 and 37. As hereinbefore stated, the operation of the circuits of Figs. 11 and 12 will be completed in an interval considerably shorter than the interval measured by the successive closure of the springs 36 and 37.

The tubes 42 and 43 comprise a multivibrator with the tube 43 normally conducting and the tube 42 nonconducting by virtue of the adjustment of the potentiometer 46 in the grid circuit of tube 42. When the cam 35 effectively closes the circuit from the source of positive potential to the condenser 41, the potential of the grid of tube 42 is transiently raised whereby this tube becomes conducting. Its anode therefore goes Down because of the load resistor 47 and a negative pulse is transmitted by condenser 48 to the grid of tube 43 whereby this tube becomes transiently non-conducting. The period by which the tube 43 is rendered non-conducting may be adjusted by the variable resistor 49 in its grid circuit. This period is adjusted to exceed the time required for the complete operation of the circuits of Fig. 12 by any desired amount, 10 to 20 percent, by way of example.

As the tube 43 becomes non-conducting, the load resistor 50 is relieved and consequently the input of the cathode follower tube 45 goes Up so that tube 45 becomes conducting and an Up condition is established on conductor 51.

The tube 44 operates with tube 43 since its grid is also controlled by the condenser 48 and the variable load resistor 49. Therefore, as tube 43 becomes non-conducting, tube 44 likewise becomes non-conducting. Normally tube 44 therefore steadily holds a Down condition on the conductor 52 so that both the 0 latch 53 and the "Home" latch 54 are held in the On condition. When tube 44 then becomes non-conducting for this timed period these two latches are then released for normal operation.

It will be noted that both the And circuit 55 for the double inverter 53 and the And circuit 56 for the Home double inverter 54 are controlled by the NCP lead and since this is normally Up these two latches will remain in the On condition as the tube 44 becomes non-conducting. All the other latches of Fig. 12 are in the Off condition at this time.

Throughout the normal period of the trigger circuit of Fig. 11 wherein conductor 51 is Down and conductor 52 is Down, the latch unit 57 turns on with the PBP pulse and off with the NAP pulse and the PCP pulse therefore passes through And circuit 58, and operates INV 59 to produce a Down condition through CF60 on conductor 61. Since conductor 51, however, is Down, And circuit 62 and the 00 double inverter circuit 63 are inoperative.

The multi-vibrator circuit of Fig. 11 releases all units, leaving the 0 unit 53 and the Home unit 54 in the On condition.

The next NCP pulse, releases the And circuit 55 and the And circuit 56 whereby the 0 unit 53 and the Home unit 54 are released. The release of the 0 unit 53 causes the operation of the 1 unit 64 over the conductor 65 and the release of the Home unit 54 causes the operation of the 00 unit 63 over the conductor 66. Therefore it will appear that the units 1 latch 64 and the tens 00 latch 63 are set simultaneously upon the occurrence of the next NCP pulse following the activation of the trigger circuit of Fig. 11.

With the units 1 latch 64 and its CF circuit 67 Up and the tens 00 latch 63 with its CF circuit 68 Up, coincidence is established in And circuit 69 whereby cathode follower tube 70 is rendered conducting and an Up condition will be placed on the 01 terminal 71.

The next negative pulse transmitted over the NCP lead will drive the latch 64 Down, with the consequence that a negative transfer pulse will be transmitted over the conductor 72 to drive the second inverter of the latch 73 Up whereby the CF74 becomes energized to drive its output Up. This Up condition now transmitted to thte lower input of And circuit 75 will be maintained until the normal Up condition on the NCP lead is reestablished so that the number 2 units latch is locked in. In this manner the Up condition on the number 1 units latch is released and the Up condition on the number 2 units latch is established in the manner shown by the graphs seven and eight of Fig. 8. Thus the ten units latches will start and continue to operate in succession.

During the time while the 0 units output is Up, an Up condition will be transmitted to the lower input of the And circuit 76 which will then be present when a positive B pulse is transmitted over the PBP lead. Coincidence is established at And circuit 76, the output thereof goes Up and this Up condition is transmitted through the Or circuit 77 to the latch unit 57. The CF78 is driven Up to provide an Up condition on the lower input of And circuit 58 and the lower input of And circuit 79.

Since the upper input of And circuit 79 is connected to the NAP lead it will be normally Up and therefore the latch 57 will be locked in until the following A pulse is transmitted. In the meantime a positive C pulse will be transmitted over the upper input of And circuit 58 so that the inverter 59 and its CF60 will be transiently depressed to transmit a negative pulse over the common input 61 of the tens latches. This, however, will have no effect until the release of the 00 unit 63 which will occur when the 0 unit 53 is next operated, and the And circuit 76 is rendered responsive to a PBP pulse.

With this explanation it will be clear that as the units ring of latches are successively operated, the tens chain will be advanced each time the units 0 latch is operated. There are eighty And circuits such as the And circuit 69 and eighty terminals such as the 01 terminal 71 so that these are successively driven to an Up condition. Thus a means for successively operating the eighty columns of the core matrix is provided.

Normal operation under control of the NCP pulses continues the operation until such time as the units 0 unit, 53 and the tens 70 unit are concurrently operated (i. e. the 80th column). Following this count the units ring continues to run but without further activation of intersections since the tens ring has run off the end. The return of the multivibrator terminates the operation in that the 0 unit 53 and the Home unit 54 are again forced into the On condition and with conductor 51 Down all others are held off.

Figure 13:
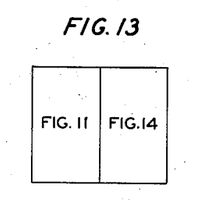
Fig. 13 is another block diagram showing how Fig. 14 may be placed with Fig. 11 to disclose another embodiment of the invention.
Figure 14:
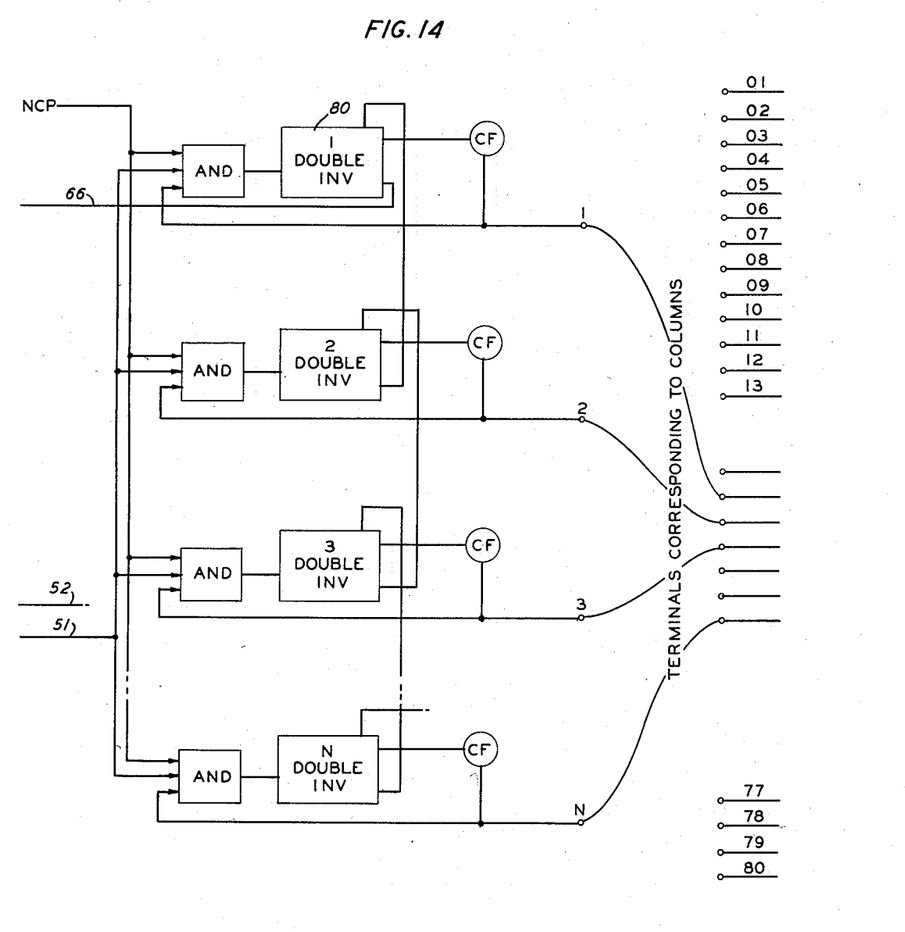
Fig. 14 shows a simpler arrangement of counting means employing a limited number of latches but providing a flexible arrangement whereby selected columns limited in number may be scanned over temporary jumper connections.

Fig. 13 indicates how Figs. 11 and 14 may be placed to disclose an alternative arrangement where but a few columns are to be compared and where those to be compared may be selected and arranged by means of jumpers which are quickly rearranged. Here, as shown in Fig. 14, an open chain of latches 1, 2, 3 and N are shown. The number 1 latch 80 will be triggered on as the Home latch 54 is returned to normal, that is, as tube 44 becomes non-conducting and frees the conductor 52 to allow the normal operation of the double inverter 54. The conductor 52 is not employed in the open chain as before, but only the conductor 66 is used to start the operation. In this case the terminals of the latches are directly coupled by jumpers to the terminals corresponding to the various columns of the card and an indefinite number may be used, as indicated. Since the number 13 terminal of the last unit is left unconnected the chain is left open and the action will stop as the tens chain stopped hereinbefore. Thus a flexible arrangement may be provided whereby the business machine may be quickly prepared for any desired comparing operation.

Figure 10:
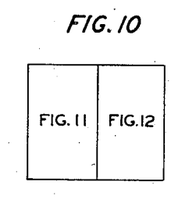
Fig. 10 is a block diagram showing how Figs. 11 and 12 may be arranged to provide a schematic logical and circuit diagram to disclose one embodiment of the invention.
Figures 15, 16:
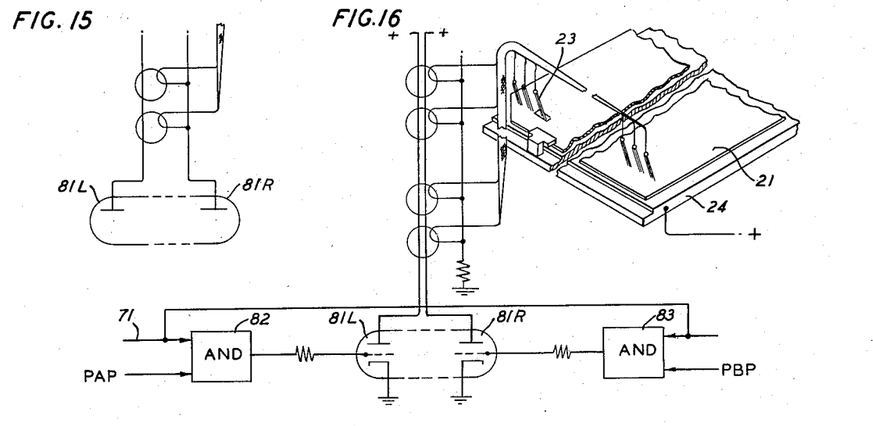
Fig. 15 is a fragmentary circuit diagram showing a circuit arrangement of the read out and read in wires alternative to the arrangement of Fig. 16.
Fig. 16 is a circuit schematic of one of the eighty circuits tied to and responsive to signals on the eighty output circuits of Fig. 9.

Fig. 16 shows one of the eighty circuits leading to the conductors interlinked with each of the bistable magnetic memory element cores of a single column. Here the output terminal 71 of Fig. 10 is shown connected to the upper inputs of And circuit 82 and And circuit 83. The output circuit of And circuit 82 becomes the input to tube 81L while the output circuit of And circuit 83 becomes the input to tube 81R.

A card 21 (as in Fig. 9) is shown in this figure with a brush 23 entering a hole therein and making contact with the base plate 24. The normal circuit thus made extends through a corresponding bistable element to provide a $+H_1$ energization of the core thus moving it to stake $k$ if already positively energized or to state $l$ if it is at binary 0. Other cores in this same column for which no connection is made through their corresponding brushes will remain in their state $f$ if previously energized or in their state $a$ if not previously energized.

While the terminal 71 is Up, for a period such as shown in the seventh graph of Fig. 8 (which will overlap a positive A pulse and a following positive B pulse) the occurrence of a positive A pulse (PAP) will establish coincidence in the And circuit 82 with a consequent movement of the output thereof and the input of tube 81L to Up. Tube 81L becoming active will cause sufficient current to flow in its anode circuit to cause a minus energization of all the cores in this column by a $-3H_1$ value.

Any core which may be at state $f$ or state $k$ will be moved to binary 0 and in so moving will produce an output signal. All the other cores whether at $a$ or $l$ will also be moved to binary 0 but will not produce an output signal. Thus the operation of tube 81L will erase the record previously made and in this operation will create a signal from any core in the column which has been energized on the previous cycle, and which will be transmitted over a horizontal circuit to be described hereinafter.

Following this, and within the time period during which the terminal 71 is Up, a positive B pulse (PBP) will produce coincidence in And circuit 83 whereby tube 81R will conduct and provide a current to produce $+H_1$ in all cores in the column. Since that particular core associated with that brush which has found a punched hole is at this time at $l$ because of the brush current, then the curve $l\ b\ c\ d\ e$ will be traced. Thus an outgoing signal will be transmitted over that horizontal circuit corresponding to a punched hole. If there is no punched hole in the entire column there will be no output signal.

It may be noted that the read out signal (timed by PAP) if any will be of opposite polarity to the read in signal (timed by PBP). It will be understood that although the two halves of the tube 81 are shown as identical, proper circuit arrangements will be made since tube 81L must produce a pulse three times as great as the tube 81R. It will be assumed that such well known provisions are properly made.

As an alternative arrangement as shown in Fig. 15, the single conductor interlinking all the cores in this vertical column and connected to the anode of tube 81R may be eliminated and this anode may be connected to the common wire of the individual loops interlinked with the cores. In this case both anode circuits will provide a $-2H_1$ and a $+2H_1$ energization of the cores respectively. Thus on read out at A time any core which has been driven to binary 1 on a previous scanning operation will be restored and will transmit a signal over a corresponding horizontal wire (see Fig. 17). Similarly at B time that core which is interlinked with an individual brush which has found contact through a punched hole in the business machine card being scanned, will be driven to binary 1 and a signal will be transmitted over corresponding horizontal wire.

Figure 17:
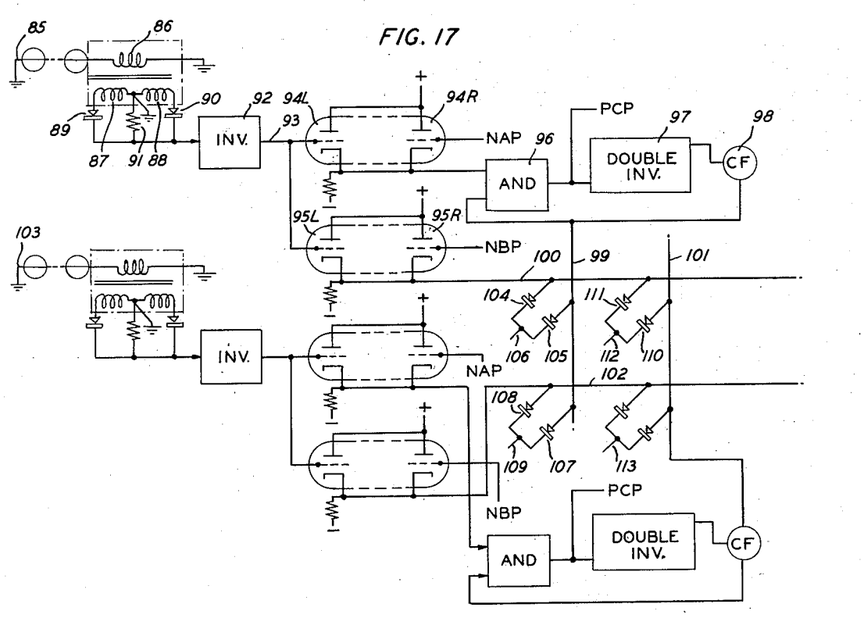
Fig. 17 is a schematic circuit showing the arrangements for receiving the signals from two horizontal lines whereby such signals may be merged in a matrix to produce a high, an equal, or a low output signal.

Fig. 17 is a schematic circuit diagram showing the means for the disposition of the pulses created in the successive operation of the tubes 81L and 81R. Each horizontal row of cores (eighty in such a horizontal row) has a signal wire such as the wire 85. This leads in to the primary of a transformer 86 which acts through its secondaries 87 and 88, which are oppositely wound, together with the diodes 89 and 90 and the resistor 91 to deliver a positive pulse to the inverter 92. The read out pulse being negative will create such a pulse by the secondary 87, the diode 89, and the resistor 91, whereas the read in pulse will create such a pulse by the secondary 88, the diode 90, and the resistor 91.

It will be recognized, of course, that Fig. 17 is schematic and that for the sake of clearly disclosing the essential operations such necessary provisions as sufficient amplification in the wire 85, load resistors to a source of negative potential connected to the inputs of tubes 94L, 95L, etc. and to the conductors 106, 109, 112 and 113 are omitted.

The output 93 of the inverter 92 is normally Up and hence the outputs of the tubes 94L and 95L are normally Up. Since the input NAP of the tube 94R and the input NBP of the tube 95R is normally Up, it will be seen that the upper input of the And circuit 96 is normally Up. Since the input of the double inverter 97 is connected to the PCP lead, it will be seen that this double inverter will be reset Up at the end (or the beginning)

of each cycle. Therefore, the CF98 will be Up, the And circuit 96 will be in coincidence, and this latch will be locked in.

Conductor 99, the output conductor controlled by tubes 94L and 94R will be normally Up. Likewise conductor 100 similarly controlled by tubes 95L and 95R will be normally Up. Going back further it may be seen that both conductors 99 and 100 are under control of the signal conductor 85. Likewise it may readily be seen that the similar conductors 101 and 102 are primarily under control of the signal conductor 103.

A diode 104 leading from conductor 100 and a diode 105 leading from conductor 99 have their outputs both connected to a signal wire 106 and they constitute an Or circuit. However, since both their inputs are normally Up the signal wire 106 will be normally Up and these two diodes will therefore act as an And circuit since both must go Down to bring the signal wire 106 Down.

Now it may be noted that there will be a number of signal wires such as 106 equal to the square of the number of conductors such as 85 and that they are arranged on a matrix basis. To explain the operation of this network let it first be assumed that there is both a read out pulse and a read in pulse transmitted over the conductor 85. The read out pulse will occur in the time of the A pulse and since the INV92 brings its output Down at exactly the same time as the tube 94R is rendered nonconducting by the negative A pulse (NAP) the tube 94L will also cease to conduct and the upper input of And circuit 96 will go Down. Thus the latch having the output 99 will go Down and will provide what may be termed an embracing pulse, for this latch will remain Down until the next positive pulse on the PCP lead which in time is beyond the following positive B pulse. At the termination of the A pulse the upper input to And circuit 96 will go Up again but the output wire 99 remains Down.

It has been assumed that a read in pulse is next transmitted over the wire 85. Since the tubes 95L and 95R both become inactive in the B time the conductor 100 will go Down at this time and therefore coincidence will be established by the virtual And circuit consisting of diodes 104 and 105 and the terminal 106 will go Down.

It may also be noted that even though diode 107 may be Down, diode 108 will still be Up and therefore terminal 109 will remain Up. Likewise, even though diode 110 is Down, diode 111 remains Up and therefore terminal 112 remains Up.

The arrangement of the output terminals is such that terminals 106 and 113 will provide an equal indication, terminal 109 will provide a high indication, and terminal 112 will provide a low indication.

Where the business cards have space for ten numerical items (digits 0 through 9) such an output terminal matrix would be ten read out wires crossing ten read in wires thus providing one hundred junctions. This is simply shown in Fig. 18 in which each junction is shown as a solid black dot to indicate its connection to a low indication network, a square to indicate its connection to an equal indication network or an open circle to indicate its connection to a high indication network.

Figure 19:
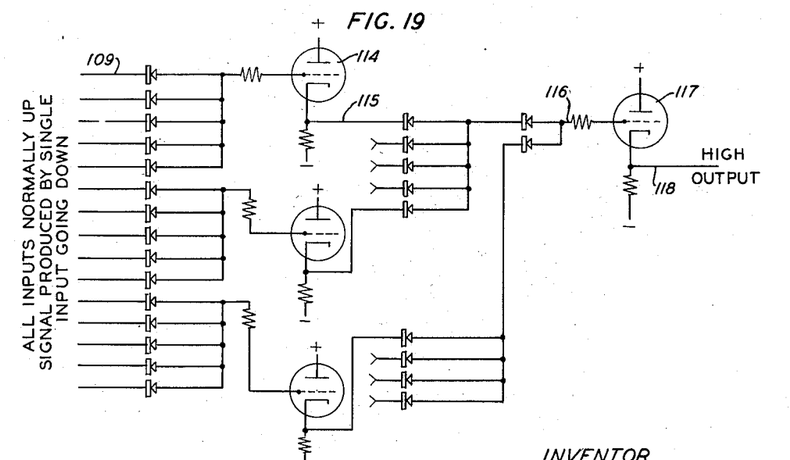
Fig. 19 is a fragmentary circuit schematic showing how a large number of normally Up matrix output wires may be connected into a normally Up And circuit whereby such circuit will respond as an Or circuit to a Down signal on any one thereof.

Fig. 19 shows an arrangement of an And circuit having forty-five inputs each normally Up whereby the final output thereof is normally Up so that the signal consists of a movement of some one of the forty-five inputs to Down. Each of the inputs such as 109 (see Fig. 17) is normally Up so that this multi-input And circuit will now act as an Or circuit and will respond to a negative pulse on any one of the said forty-five inputs. Should the terminal 109 be driven Down then the cathode follower 114 will go Down. This in turn will drive the output 115 thereof Down whereby the input 116 of the cathode follower 117 will go Down. This, again in turn, will drive the high output wire 118 Down.

Figure 18:
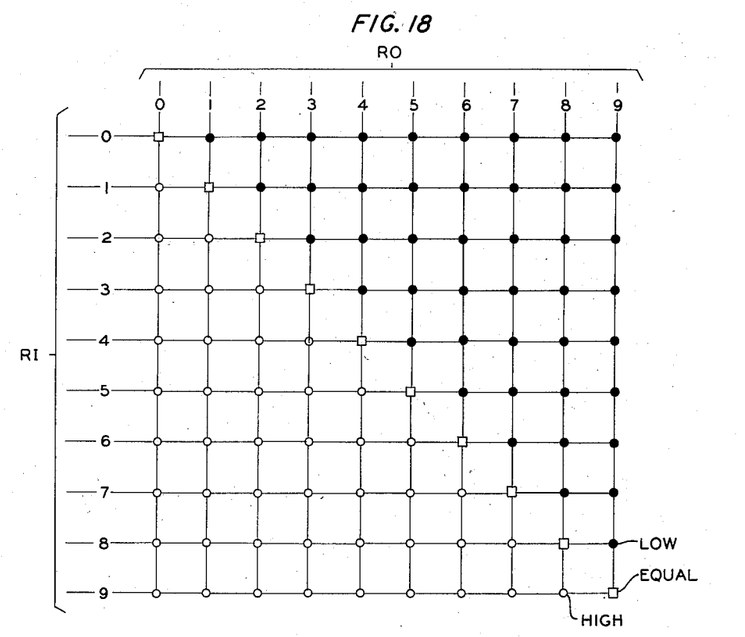
Fig. 18 is a schematic of a matrix indicating the location with respect to the horizontal signal wires from the core matrix, of the output terminals of Fig. 12 for producing the high, equal, or low final indications.

There will be a similar circuit for the ten equal matrix points (shown in Fig. 18 by squares) and another similar circuit for the forty-five low matrix points (shown in Fig. 18 by solid dots).

Thus an indication that the value of the read in pulse is higher than, equal to, or lower than, the value of the read out pulse may be produced and this indication may be used for conventional purposes, such as shown by way of example in the said Dayger et al. Patent 2,573,313.

What is claimed is:

1. In combination, means for sequentially entering the data from each card of a sequence of punched cards into a matrix of magnetic core storage devices, means for sequentially reading out the data stored in said matrix immediately prior to the sequential entry of the data from the next card of the sequence, means for manifesting a signal upon the reversal of the state of magnetization of each core storage device, and means for comparing the manifestation of said manifesting means upon entering data into a core with the immediately prior manifestation produced upon reading data out of the core.

2. In a punched card operated business machine, a sensing station having an array of electrodes arranged in columns and rows and equal in number to the possible number of holes that might be punched in a said card, each said electrode being capable of closing an electrical circuit when and if it encounters a punched hole upon proper seating of a said card at said sensing station, a matrix of magnetic core storage devices arranged in a like array of columns and rows and equal in number to said number of electrodes, an individual read in circuit interlinked with each said core and terminating in a corresponding one of said electrode circuit closers, a read out and a read in conductor interlinked with the cores of each said column, means for sequentially energizing first said read out conductor and second said read in conductor, a signal conductor interlinked with each core of each said row, means connected to each said signal conductor responsive to signals induced therein by a change in magnetic state of one of said cores interlinked therewith resulting from the said sequential energization of said read out and read in conductors, means for prolonging said read out signals over the time of said subsequently transmitted read in signals and means for combining the read out and read in signals for each said column into a machine control signal.

3. In a punched card operated business machine, a sensing station having an array of electrodes arranged in columns and rows and equal in number to the possible number of holes that might be punched in a said card, each said electrode being capable of closing an electrical circuit when and if it encounters a punched hole upon proper seating of a said card at said sensing station, a matrix of magnetic core storage devices arranged in a like array of columns and rows and equal in number to said number of electrodes, an individual read in circuit interlinked with each said core and terminating in a corresponding one of said electrode circuit closers, a read out conductor interlinked with the cores of each said column, a read in conductor connected to said electrodes of each said column, means for sequentially energizing first said read out conductor and second said read in conductor, a signal conductor interlinked with each core of each said row, means connected to each said signal conductor responsive to signals induced therein by a change in magnetic state of one of said cores interlinked therewith resulting from the said sequential energization of said read out and read in conductors, means for prolonging said read out signals over the time of said subsequently transmitted read in signals and means for combining the read out and read in signals for each said column into a machine control signal.

4. A combination as claimed in claim 2 additionally characterized in this, that means is provided to operate said means for sequentially energizing said read out and read in conductors, for each said column in sequence.

5. A combination as claimed in claim 3 additionally characterized in this, that means is provided to operate said means for sequentially energizing said read out and read in conductors for each said column in sequence.

6. In a punched card operated business machine, a sensing station having an array of electrodes arranged in columns and rows and equal in number to the possible number of holes that might be punched in a said card, each said electrode being capable of closing an electrical circuit when and if it encounters a punched hole upon proper seating of a said card at said sensing station, a matrix of magnetic core storage devices arranged in a like array of columns and rows and equal in number to said number of electrodes, an individual read in circuit interlinked with each said core and terminating in a corresponding one of said electrode circuit closers, means for driving any core in a binary 1 state to its normal binary 0 state and reading out such change in state, means for thereafter driving an electrode selected core from its binary 0 state to its binary 1 state and reading in such change of state, said driving means being operated in sequence column by column, merging circuits simultaneously responsive to read out and read in signals, comprising means responsive to read out signals for prolonging and applying such signals, a plurality of 1st coordinate matrix conductors, each said conductor corresponding to a row of said cores, means responsive to read in signals for applying such signals to a plurality of 2nd coordinate matrix conductors, each said conductor corresponding to a row of said cores, and And circuit at the crossing point of each said 1st coordinate conductor and said 2nd coordinate conductor having an input connected to each of said coordinate conductors and an output connected to a machine control signal circuit.

7. A sequence circuit for sequentially energizing a plurality of serially numbered conductors, consisting of a plurality of units digit latches arranged in a closed ring and a like plurality of tens digit latches arranged in an open chain, each said latch consisting of an And circuit, a double inverter responsive to said And circuit, and a cathode follower circuit responsive to said double inverter and having an output circuit leading to one input of said And circuit and providing an output for said latch, an input for said latch leading to another input of said And circuit, a start input conductor for said sequence circuit, a carry conductor from one of said ring of units digits latches to the input of said tens digit latches and a matrix of And circuits each having one input connected to a units digit latch output and another input connected to a tens digit latch output, each said matrix And circuit having an output constituting one of said serially numbered conductors.

8. In a punched card operated business machine, a sensing station having an array of electrodes arranged in columns and rows and equal in number to the possible number of holes that might be punched in a said card, each said electrode being capable of closing an electrical circuit when and if it encounters a punched hole upon proper seating of a said card at said sensing station, a matrix of magnetic core storage devices arranged in a like array of columns and rows and equal in number to said number of electrodes, an individual read in circuit interlinked with each said core and terminating in a corresponding one of said electrode circuit closers, a pair consisting of a read out and a read in conductor each interlinked with the cores of each said column, means for sequentially energizing said pairs, means for sequentially energizing first said read out conductor and second said read in conductor, a signal conductor interlinked with each core of each said row, means connected to each said signal conductor responsive to signals induced therein by a change in magnetic state of one of said cores interlinked therewith resulting from the said sequential energization of said read out and read in conductors, means for prolonging said read out signals over the time of said subsequently transmitted read in signals and means for combining the read out and read in signals for each said column into a machine control signal.

9. In a punched card operated business machine, a sensing station having an array of electrodes arranged in columns and rows and equal in number to the possible number of holes that might be punched in a said card, each said electrode being capable of closing an electrical circuit when and if it encounters a punched hole upon proper seating of a said card at said sensing station, a matrix of magnetic core storage devices arranged in a like array of columns and rows and equal in number to said number of electrodes, an individual read in circuit interlinked with each said core and terminating in a corresponding one of said electrode circuit closers, a pair consisting of a read out and a read in conductor each interlinked with the cores of each said column, means including a serially numbered conductor associated with each said pair, means for sequentially energizing said serially numbered conductors for controlling said pairs, said last means comprising a sequence circuit for sequentially energizing a plurality of serially numbered conductors, consisting of a plurality of units digit latches arranged in a closed ring and a like plurality of tens digit latches arranged in an open chain, each said latch consisting of an And circuit, a double inverter responsive to said And circuit, and a cathode follower circuit responsive to said double inverter and having an output circuit leading to one input of said And circuit and providing an output for said latch, an input for said latch leading to another input of said And circuit, a start input conductor for said sequence circuit, a carry conductor from one of said ring of units digits latches to the input of said tens digit latches and a matrix of And circuits each having one input connected to a units digit latch output and another input connected to a tens digit latch output, each said matrix And circuit having an output constituting one of said serially numbered conductors, means for sequentially energizing first said read out conductor and second said read in conductor, a signal conductor interlinked with each core of each said row, means connected to each said signal conductor responsive to signals induced therein by a change in magnetic state of one of said cores interlinked therewith resulting from the said sequential energization of said read out and read in conductors, means for prolonging said read out signals over the time of said subsequently transmitted read in signals and means for combining the read out and read in signals for each said column into a machine control signal.

10. Means for comparing the records of a pair of business machine cards successively passed through a single sensing station, comprising a matrix of bistable memory elements for retaining the memory of the record of a first of said cards established by a read in operation as said card is in said station and retained after said card has passed out of said station, time space read out means for discharging the memory of a card which has passed out of said station and read in means for thereafter reading in to said matrix of memory elements the memory of the record of a card presently in said station, a first means responsive to said read out means for producing and prolonging a read out signal and a second means responsive to the said following time spaced read in means for producing a read in signal within the time of said prolonged read out signal and means for combining said read in and said prolonged read out signals into machine controlling signals.

No references cited.